June 21, 1960 J. J. SKELLY 2,941,273
CLAMP
Filed Aug. 18, 1958

*INVENTOR.*
JAMES J. SKELLY
BY
Bates, Teare & McBean
ATTORNEYS

United States Patent Office 2,941,273
Patented June 21, 1960

2,941,273
CLAMP

James J. Skelly, Lyndhurst, Ohio, assignor to Specialty Products Corporation, Cleveland, Ohio, a corporation of Ohio Filed Aug. 18, 1958, Ser. No. 755,567

8 Claims. (Cl. 24—279)

This invention relates in general to the art of clamps and more particularly to an adjustable type band clamp having high strength characteristics.

The general arrangement of the clamp is the type having a latching device carried by one end of an expansible band element and adapted to cooperate with the head of a T-bolt carried by a trunnion which is mounted on the other end of the band element, so that in connecting or applying the clamp or disconnecting or removing the clamp, the bolt does not have to be disconnected from the trunnion and the nut does not have to be removed from the bolt.

In certain prior art arrangement, the above mentioned bolt latching device comprises a U-shaped bracket pivotally mounted on the associated end of the strap by a rivet or flattened headed pin passing through openings in the free ends of the U-shaped bracket and through a closed loop portion formed on the end of the band. Such prior art arrangements have not been found to be entirely satisfactory in that such a pivotal latching device is quite readily subject to failure or fracture upon heavy tightening of the clamp, due in part to the weakening of the bracket because of the attaching pin openings through the free ends thereof.

The present invention provides a novel construction of pivotal latching bracket for a clamp of the above discussed type which does not utilize rivets or any other type of fastener to attach the latching bracket to the band of the clamp, and which is comprised of a plurality of stampings having locating means thereon for facilitating the assembly of the stampings into a unitary high-strength latching bracket.

Accordingly, an object of the invention is to provide an adjustable clamping device having improved strength characteristics.

Another object of the invention is to provide an expansible band clamping device including a latching bracket pivotally mounted on one end of the band of the clamp and adapted to coact with the head of a T-shaped bolt connected to the other end of the band of the clamp for holding the expansible clamping device in predetermined position, and wherein the latching bracket is comprised of a plurality of parts, preferably stampings, and being so constructed and arranged to provide a high strength latching bracket and associated clamp.

A more specific object of the invention is to provide an expansible band clamping device including a latching bracket pivotally mounted on one end of the band of the clamp and adapted to coact with the head of a T-shaped bolt connected to the other end of the band for holding the expansible clamping device in selective predetermined position, and wherein the latching bracket comprises a closed strap of rectangular-like configuration in plan view, and a pair of hollow generally cylindrical shaped, split sleeve bearing elements, with one of the bearing elements being adapted to be received in the other of the cylindrical bearing elements in the assembled position of the latching bracket, and wherein said cylindrical bearing elements and said closed strap element include means for locating and interlocking the sleeve elements and the strap element with respect to one another.

Other features and advantages of the invention will be apparent from the following description taken in conjunction with the drawings wherein.

Figure 2:
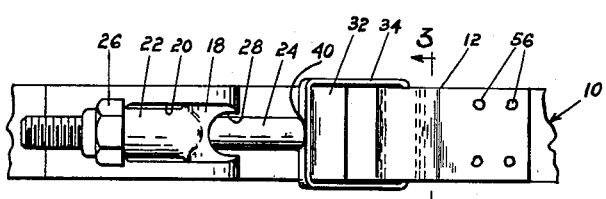
Fig. 2 is a top plan view of the structure illustrated in Fig. 1.
Figure 3:
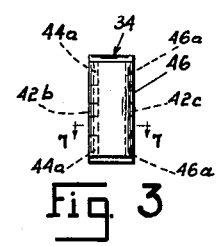

Fig. 3 is an end view illustrating in particular the closed strap element of the latching bracket with the cylindrical shaped bearing or split sleeve elements being assembled therewith, and is taken substantially along the plane of line 3—3 of Fig. 2, looking in the direction of the arrows, but with the retaining loop portion of the band of the clamp removed, to more clearly illustrate the structural arrangement of the latching bracket.

Figure 1:
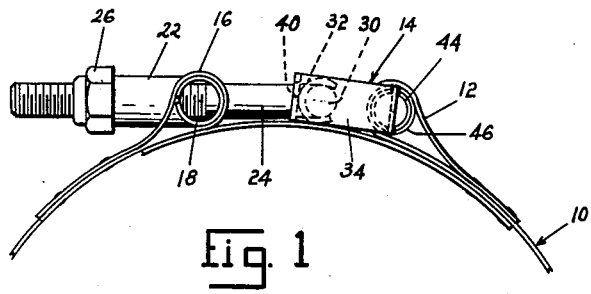
Fig. 1 is a side elevational view of a portion of the band clamp at its free ends, and illustrating the pivotal latching device and associated T-shaped holding bolt.
Figure 4:
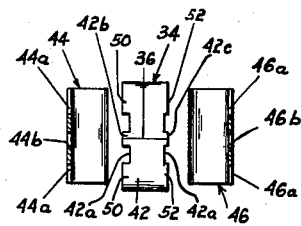

Fig. 4 is a more or less exploded view of the structure shown in Fig. 3, and with the cylindrical split sleeve bearing portions of the latching bracket being shown in section.

Figure 5:
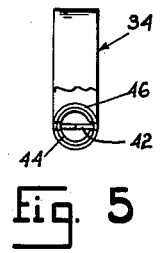

Fig. 5 is a side elevation of the latching bracket with one side portion thereof being broken away, to better illustrate the assembly of the cylindrical bearing elements with respect to the closed strap element of the bracket in the final assembled condition of the latter.

Figure 6:
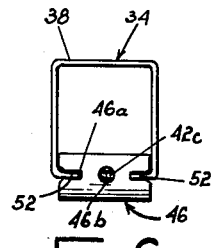

Fig. 6 is a view taken from the right-hand side of Fig. 5.

Figure 7:
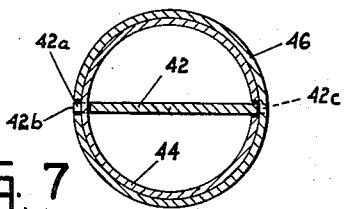

Fig. 7 is an enlarged sectional view taken substantially along the line 7—7 of Fig. 3.

Figure 8:
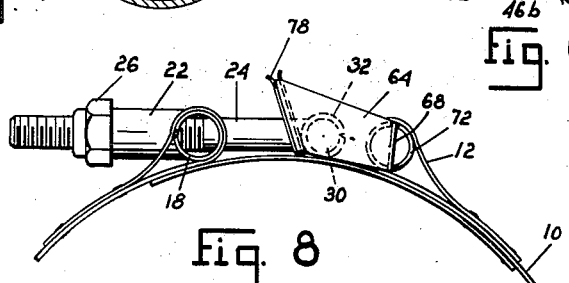

Fig. 8 is a side elevation of a band clamp at its free ends and illustrating a modification of the invention.

Figure 9:
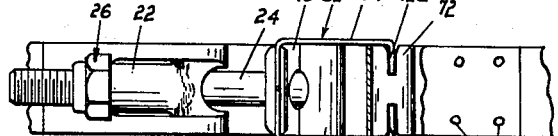

Fig. 9 is a partly broken, top plan view of the modification illustrated in Fig. 8.

Figures 10, 11:
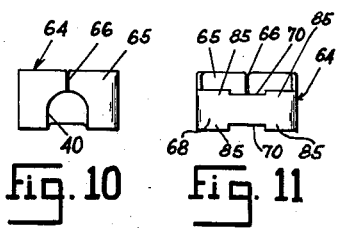

Fig. 10 is a front elevational view of the closed, bolt-head engaging strap element of the latching bracket of the Fig. 8 modification.

Fig. 11 is a rear end view of the strap element of Fig. 10.

Figure 12:
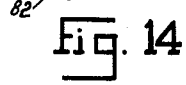

Fig. 12 is a bottom plan view of the latching bracket assembly of the modification with a U-shaped clip being attached to the front end thereof, and a hollow split-sleeve, cylindrical bearing portion being secured to the rearward end of the strap element.

Figure 13:
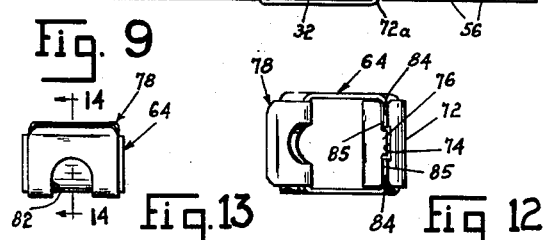

Fig. 13 is a front elevational view of the latching bracket assembly shown in Fig. 12.

Figure 14:
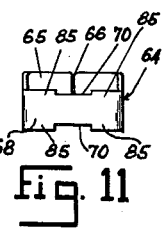

Fig. 14 is a vertical sectional view taken substantially along the line 14—14 of Fig. 13 looking in the direction of the arrows.

Referring again to the drawings, No. 10 designates the expansible band of the clamping device, such band being preferably comprised of rustless flexible steel. One end of the band 10 is bent back to form a closed loop portion 12 which pivotally connects the bolt latching bracket assembly 14, with which the invention is particularly concerned, to the band proper. The other end of the band is doubled back to form another closed loop portion 16 in which a trunnion 18 is pivotally mounted, the loop 16 being slotted as at 20 to permit passage of guide 22 therethrough. The T-shaped bolt 24 passes through guide 22 and a threaded abutment 26, such as the nut illustrated, is carried thereby for adjusting the clamping action of band 10. The trunnion is apertured as at 28 (Fig. 2) for passing the shank of the bolt 24 therethrough. The bolt has a head portion 30 which may be provided with a split bearing sleeve element 32, as shown.

In accordance with the invention, the latching bracket assembly 14 comprises a generally rectangular shaped strap element 34 (Fig. 6), which is preferably formed from a stamping of strip metal, and bent into the configuration shown, with the joining seam 36 of the strap element being disposed on the rearward end thereof. The front wall 38 of the strap element is suitably apertured as at 40 for the passage therethrough of the shank of bolt 24. The rear wall 42 of strap element 34 is provided with a plurality of marginal slots 42a for a purpose to be hereinafter described. Slots 42a are disposed adjacent the aforementioned seam 36 and define lugs 42b and 42c, as may be best seen in Fig. 3 of the drawings.

In order to provide a suitable bearing arrangement for the strap element 34 on the closed loop 12 of the clamp band 10, a plurality of split sleeve or split cylindrical-like elements 44 and 46 are provided.

Element 44 is of a slightly lesser diameter as compared to element 46 with the latter being adapted to encircle element 44 in the assembled condition of the latching bracket 14 (Fig. 7). Each end of element 44 on the side opposite to the split side thereof is provided with a marginal recess or aperture 44a. An opening 44b is disposed intermediate recesses 44a and in generally aligned relation therewith. Sleeve element 46 is provided with a like arrangement of marginal recesses 46a and an intermediate opening 46b, on the side thereof opposite to the split side of sleeve 46.

In assembling the latching device 14, sleeve element 44 is slipped over end wall 42 of strap element 34, through the split side thereof, with the lug or projection 42b on the strap element being received into opening 44b in the sleeve 44, and with the marginal shoulder portions 50 of the strap element being received in generally snug relation in the recesses 44a in the sleeve, to thereby interlock the sleeve element 44 with the strap element. The sleeve element 46 is then slipped over the opposite side of end wall 42 in generally encircling relation with sleeve element 44, element 46 being split sufficiently open to permit the latter encirling relation, with the projection 42c on the end wall of the strap element being received in opening 46b in the sleeve 46 and with the shoulder portions 52 on the strap element being received in generally snug relation in recesses 46a in sleeve 46. Sleeve 46 is then circumferentially clamped or squeezed by any suitable means to contract the sleeve 46 around sleeve element 44 and additionally cause contraction of the latter, thereby rigidly securing the bearing sleeve elements to the strap element 34. As may be best seen from a consideration of Figs. 3 and 7, the slots 42a in the marginal edges of end wall 42 of strap element 34 are sufficiently deep so that in the final assembled condition of the bearing sleeves 44 and 46 with the strap element, the exterior surface of sleeve element 46, at the junctures of the latter with end wall 42 of the strap element, is generally flush with the terminal edges of said end wall, with the latter extending generally along the diametrical dimension of the sleeve elements and with the sleeve elements being generally concentric.

The latch assembly 14 may then be inserted into the loop 12 of the clamp prior to the positive securing of the loop, as by means of spot welds 56, to the band proper. Thus, there is provided a high strength, compartively economical latching device which includes a novel construction of bearing means, for pivotally mounting the latching device on the band proper.

Referring now to the Fig. 8 to 12 modification of the invention, the general arrangement of the clamping device is substantially the same as that shown in the Fig. 1 to 7 embodiment. The bolt head engaging element of the latching device assembly 62 in the modification, comprises an inverted, truncated, pyramidal shaped strap element 64 of closed configuration, as in the first described strap element, preferably stamped from a strip of metal, but however with the joining seam 66 of the strap being disposed at the forward end or in the front wall 65 thereof. The rear wall 68 of the strap element 64 is provided with generally centrally disposed slots 70 adjacent the marginal edges thereof.

A split-sleeve, cylindrical-like bearing element 72 is provided for pivotally mounting the bolt engaging strap element 64 in loop portion 12 of band 10 of the modification. Sleeve 72 comprises a recess 72a adjacent each terminal end thereof extending generally transversely of the sleeve (as viewed in Fig. 9). Recesses 72a are disposed on the side of the sleeve opposite the split side thereof. The split side of the sleeve comprises a complementary groove and tongue arrangement 74 and 76 respectively, for a purpose to be hereinafter described.

A generally U-shaped, somewhat resilient, clip 78 is provided for clasping engagement with the front seamed wall 65 of strap element 64. The leading edges of clip 78 are diverged outwardly with respect to one another, as at 80 (Fig. 14), to facilitate the application of the clip to the strap element. The clip is provided with an arch-shaped opening 82 therein which is generally complementary to the bolt shank receiving opening 40 in the strap element 64, when the clip and strap element are in assembled relation. Clip 78 extends substantially the full length of front wall 65 of the strap element, and may be spot welded thereto for positive retention of the clip in predetermined position. The clip strengthens the abutting seam 66 of the front wall and prevents deformation thereof during clamping operations.

In assembling the bearing sleeve element 72 to the rear wall 68 of the clip, the split side of the sleeve is slipped over the end wall until the bridging portion of the sleeve intermediate the marginal recesses 72a is received in the respective slot 70 in rear wall 68 of the strap element, in generally snug relation. Tongue element 76 on the sleeve is preferably so spaced from the opposite defining surfaces 84 of the split seam of the sleeve so that a slight clamping action occurs to aid in retaining the sleeve on the strap element, in the initial application of the former to the latter. The sleeve 72 is then circumferentially clamped or squeezed by any suitable means, whereby the tongue element 76 passes into the corresponding recess 70 in the end wall of the strap element and the opposing lateral portions of the sleeve along the split or seam, clamp the marginal portions 85 of end wall 68 therebetween, thus rigidly fastening the bearing sleeve to the strap element. Slot 74 provides clearance for tongue 76 to ensure tight clasping relation between the sleeve and end wall 68. In final assembled position, it will be seen that the external circumferential surface of the bearing sleeve element is generally flush with respect to the terminal edges of the rear wall 68 of the strap at the juncture thereof, with the rear wall extending generally along the diametrical dimension of the sleeve element. The latching assembly is then attached to loop 12 of the band proper in the manner above described in connection with the first embodiment of the invention.

From the foregoing description and accompanying drawings it will be seen that the invention provides an improved expansible band clamping device having high strength characteristics and comprising a bolt head, latch engaging assembly having a closed strap portion and a split sleeve bearing portion which may be expeditiously assembled with the strap portion and thus provide effective pivotal mounting of the latching assembly to the band proper. The invention also provides a latching assembly of the latter type which includes means for locating and retaining the bearing portion of the latching assembly with the strap portion thereof and in a manner to prevent relative movement therebetween. In addition, the invention provides a latching assembly which is economical to manufacture and assemble, and which possesses long wearing characteristics in service operation.

The terms and expressions which have been employed are used as terms of description and not of limitation, and there is no intention of excluding any equivalents of the features described or shown, or portions thereof,

I claim:

1. In an adjustable clamp of the type comprising a band having free ends to one end of which a trunnion carrying a T-bolt and nut is secured and the other end of which comprises a closed loop pivotally mounting a latching bracket assembly adapted to coact in holding relation with the head of the T-bolt to hold the band in selected clamping position, said latching assembly comprising a closed polygonal-shaped strap element formed from flat metal stock and bent into said polygonal shape, said strap element comprising a generally planar end wall extending transversely with respect to said band and passing through said closed loop, a circumferentially contractable split type bearing sleeve element generally encircling said end wall, and means on said sleeve element coacting with complementary means on said end wall to locate and interlock said sleeve and strap elements together in predetermined position and against relative movement, said sleeve element providing a bearing for pivotally mounting said latching assembly in said closed loop.

2. In a clamp in accordance with claim 1, wherein said means on said end wall comprises at least one slot in a terminal edge thereof and said means on said strap element comprises a portion thereof formed complementally to said slot and received therein.

3. In an adjustable clamp of the type comprising a band to one end of which a trunnion carrying a T-bolt and nut is secured and the other end of which comprises a closed loop pivotally mounting a latching bracket assembly thereon adapted to coact in holding relation with the head of the T-bolt to hold the clamp in predetermined selected position, said latching bracket comprising a closed strap element formed from flat metal stock and bent into a polygonal configuration, said strap element including a planar end wall extending transversely with respect to said band and passing through said closed loop, and a pair of hollow cylindrical-like split sleeve elements, one of said split sleeve elements being received in telescoped relation in the other of said split sleeve elements with the latter being mounted in generally encircling relation on said end wall of said strap element for providing a bearing for pivotally mounting said latching bracket to said closed loop of said band, and means on said sleeve elements coacting with complementary means on said end wall to locate and interlock said sleeve and strap elements together in predetermined position and against relative movement therebetween.

4. In a clamp in accordance with claim 3 wherein the exterior circumferential surface of the outer one of said sleeve elements is disposed generally flush with respect to the marginal edges of said end wall of said strap element when said sleeve elements and strap element are in assembled relation.

5. In an adjustable clamp of the type comprising a band having free ends to one end of which a trunnion carrying a T-bolt and nut is secured and the other end of which comprises a closed loop pivotally mounting a latching bracket assembly adapted to coact in holding relation with the head of the T-bolt to hold the clamp in predetermined position, said latching bracket assembly comprising a closed polygonal-shaped strap element formed from a strip of metal bent into said polygonal shape, said strap element including generally planar end walls, a split sleeve element generally encircling one end wall of said strap element in clasping relation, and means to locate said sleeve element in predetermined position on said one end wall and to prevent relative movement between said strap element and said sleeve element, said means comprising a recess in said one end wall of said strap element in which is disposed in interlocking coaction a complementary portion of said sleeve element, said strap element comprising a non-connected seam in the other end wall thereof, and a U-shaped clip disposed in clasping engagement with said last-mentioned wall to strengthen the latter during clamping operations.

6. In an adjustable clamp in accordance with claim 5 wherein the free ends of said U-shaped clip comprise divergent portions for facilitating the slipping of said clip over said wall section of said strap element.

7. In an adjustable clamp in accordance with claim 5 wherein said sleeve element comprises a complementary tongue and groove arrangement on the split side thereof for aiding in interlocking said sleeve element to said strap element and wherein said one end wall includes a complementary recess in a respective terminal edge thereof receiving therein the tongue of said sleeve element.

8. An adjustable clamp in accordance with claim 5 wherein said strap element is of inverted truncated pyramidal configuration in plan view.

References Cited in the file of this patent

UNITED STATES PATENTS

| 1,976,604 | Drews | Oct. 19, 1934 |
| 2,602,678 | Mayhoff et al. | July 8, 1952 |
| 2,648,114 | Holtz et al. | Aug. 11, 1953 |

FOREIGN PATENTS

| 575,651 | Great Britain | Feb. 27, 1946 |